Figure 2:
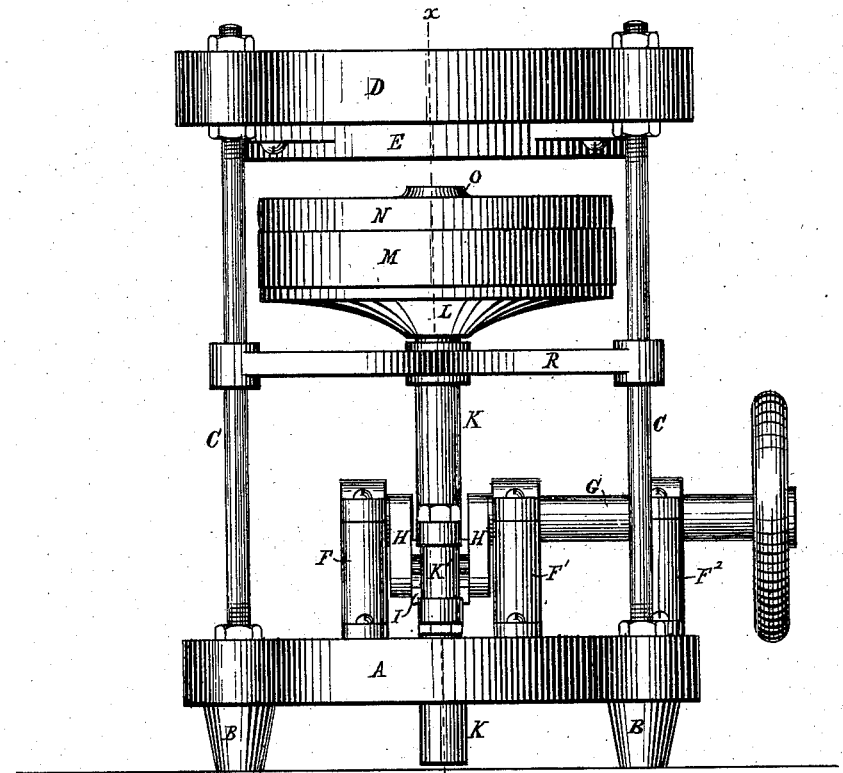

2 Sheets—Sheet 1.

B. F. YOUNG.
Tire-Setting Machine.

No. 205,227. Patented June 25, 1878.

WITNESSES.
N. C. Lombard,
E. A. Hemmenway.

INVENTOR.
Benj'a F. Young

UNITED STATES PATENT OFFICE.

BENJAMIN F. YOUNG, OF BOSTON, MASSACHUSETTS, ASSIGNOR TO YOUNG & WHEELER, OF SAME PLACE.

IMPROVEMENT IN TIRE-SETTING MACHINES.

Specification forming part of Letters Patent No. 205,227, dated June 25, 1878; application filed August 7, 1877.

*To all whom it may concern:*

Be it known that I, BENJAMIN F. YOUNG, of Boston, in the county of Suffolk and State of Massachusetts, have invented certain new and useful Improvements in Tire-Setting and Machines therefor, of which the following, taken in connection with the accompanying drawings, is a specification.

My invention relates to an improved method of and machine for setting carriage-wheel tires; and it consists, first, in setting wheel-tires by forcing said tires, after being placed around the wheel, through a taper ring-die while in a cold state, and resting upon a reciprocating follower adapted to pass freely through and at the same time fill said die at its smallest part, and to maintain said tire and the rim of the wheel at right angles to the axis of the die, thereby upsetting the tire and reducing its circumferential measurement, and causing it to hug closely to the periphery of the felly of the wheel, and at the same time compelling the rim of the wheel and the tire to conform to a true circle and to a plane at right angles to its axis of revolution.

My invention further consists in the use of a bell-mouthed or tapering ring-die of suitable diameter for a given diameter of wheel, in combination with a follower or plunger adapted to pass freely through said die, but substantially filling the smallest diameter thereof, and to support the wheel and bear around its outer edge upon the edge of the tire, and any convenient or suitable mechanism for imparting to said plunger or die a reciprocating motion in a direction parallel to the axis of the wheel, to force said tire and wheel through the die.

My invention further consists in the combination of a bell-mouthed or tapering ring-die, a follower or plunger adapted to pass freely through said die and to substantially fill its smallest diameter, and to bear around its outer edge upon the edge of the tire, and a central pin set in said follower and adapted to fit the bore of the hub or hub-box and centralize the wheel with the die, and a rest or support for the end of said hub to rest upon and to prevent a downward movement of the end of the hub below the line of said shoulder by compressing the tire upon the wheel.

My invention further consists in the use, in combination, of a taper female die removably attached to a fixed annular bed, a ring-follower removably attached to a circular disk or piston mounted upon the end of a piston-rod having formed therein a rectangular slot at right angles to said rod, and mounted in suitable bearings, and a crank-pin having fitted thereto a block fitted to and adapted to reciprocate in said slot transversely of the piston-rod as said crank-pin is rotated about the axis of its shaft, to impart to said follower a reciprocating motion in a direction parallel to the axis of the wheel, as will be described.

Figure 1:
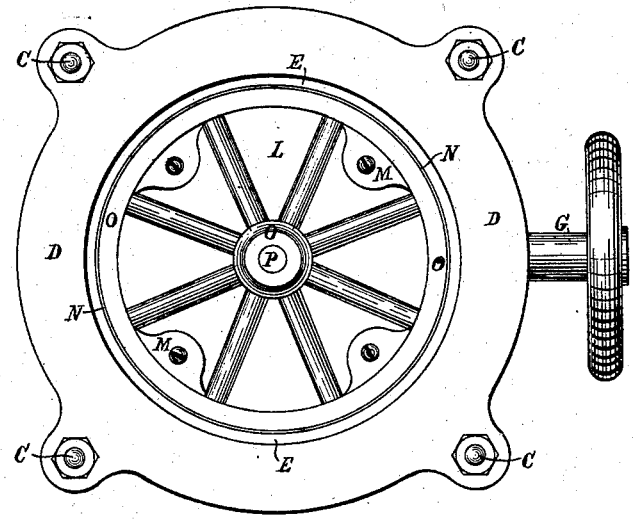
Figure 3:
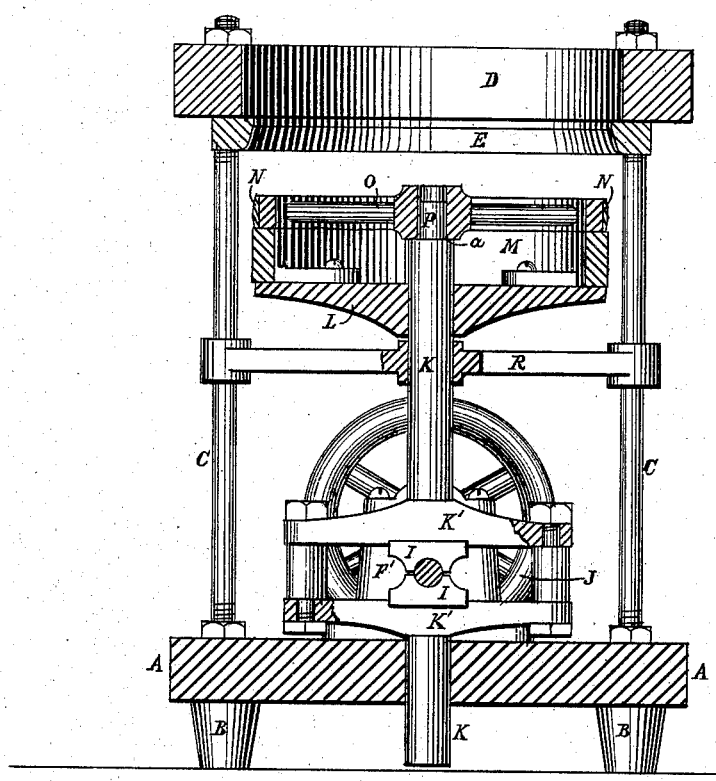

Figure 1 of the drawings is a plan of my improved machine, showing a wheel and tire in position to be operated upon. Fig. 2 is a side elevation of the same, and Fig. 3 is a vertical section on line $x\ x$ on Fig. 2.

A is the base or bed of the machine, supported upon the legs B B, and having secured thereto and projecting upward therefrom the four columns C C, to the upper ends of which is secured in a fixed position the annular bed or die support D, having a circular opening through its center of a diameter sufficient to allow the free passage through the same of the largest wheel-tire that is designed to be set upon the machine. E is a ring-die, made tapering from its under side upward, and bolted to the under side of the bed or die support D in such a manner that it may be readily removed and replaced by a die of a different diameter.

The base A has formed upon or secured to its upper side the pillow blocks or bearings F F¹ F², in which is mounted the crank-shaft G, to which rotary motion may be imparted in any well-known manner. The shaft G has formed therein the crank H, to which is fitted the block I, which in turn is fitted to and adapted to reciprocate horizontally in the slot J of the yoke K′, forming a part of the piston-rod K, to the upper end of which is firmly secured the circular disk or piston L, and having its bearings in the base A and in the tie-girt R, as shown in Fig. 3.

The piston L should be made of a diameter about equal to the diameter of the largest tire to be set by the machine, and has bolted to its upper side the ring-follower M in such a manner that it may be readily replaced by a follower of greater or less diameter, according to the diameter of the tire to be set, said follower in each case being of such a diameter that the tire to be set will rest thereon, while at the same time the follower will pass freely through the die E.

N is a tire, and O a wheel, placed in position to be operated upon by the machine to set the tire by passing upward through the die E, which is done by giving to the shaft G and crank H a rotary motion. The piston-rod K projects some distance above the piston L, and a portion of its upper end P is reduced in diameter to fit the hole in the hub of the wheel, the lower end of said hub resting upon the shoulder $a$, as shown in Fig. 3.

In setting tires with my machine, the wheel and tire are placed in the machine when the piston L is in its lowest position, with the reduced upper end of the piston-rod K fitting into the hole in the hub, thus centralizing the wheel in relation to the die, its outer rim and the tire resting on the ring-follower M, as shown in Fig. 3. The rotation of the shaft G causes the wheel and tire to be forced upward in a direct line into and through the open taper-die, the effect of which is to compress the tire and reduce its diameter till it fits closely upon the outer periphery of the wheel, the metal of the tire being upset to produce the required result, the tire being in a cold state during the whole process.

This method of setting tires is a great improvement over any of the methods now in use, so far as my knowledge extends, for the reason that forcing the tire and wheel through a perfectly round die in the manner described necessarily leaves the wheel absolutely round, with its periphery equidistant from the center of the wheel, and by virtue of the peculiar bearings of the wheel and tire upon the follower, together with the resistance presented to the passage of the tire and wheel through the die, any crooks or bends edgewise of the tire are taken out, and the wheel leaves the die not only round, but true and straight, as viewed edgewise.

Another great advantage of this method of setting tires and the use of my machine is the expedition with which tires can be set, it being practical to set tires with my machine just about as fast as the wheels and tires can be taken from piles near by and placed upon the follower.

I do not claim, broadly, setting tires on wheels by compressing them while in a cold state, as I am aware that various devices have been used to produce such a result; but

What I claim as new, and desire to secure by Letters Patent of the United States, is—

1. In a machine for setting tires upon wheels, the combination of a bell-mouthed or tapering female die and a reciprocating follower, adapted to bear around the portion of its upper surface upon the rim of the wheel and the edge of the tire, and to pass freely through and substantially fill the smallest part of said die, substantially as described.

2. In a machine for setting tires, the combination of a tapering, open-mouthed, or ring die and a reciprocating follower, adapted to pass freely through and at the same time substantially fill the smallest parts of said die, and to bear around its outer edge upon the tire and the rim of the wheel, and provided with a support for the end of the wheel-hub, adapted to prevent a downward motion of said hub, substantially as and for the purposes described.

3. The combination of a tapering ring-die, a follower adapted to pass freely through and at the same time fill the smallest parts of said die, and to bear around its outer edge upon the edge of the tire, and to be reciprocated to force the tire through said die, and a central pin adapted to enter the hole in the hub to centralize the wheel, and provided with a shoulder, $a$, to support the hub while the tire is being set, and to prevent a downward motion of said hub, substantially as described.

4. The combination, in a machine for setting tires, of the tapering ring-die E, removably attached to the die-support D, the reciprocating piston L, ring-follower M, removably attached to said piston, and the centralizing-pin P and shoulder or hub support $a$, all arranged and adapted to operate substantially as and for the purposes described.

5. In a machine for setting tires on wheels, the combination of the tapering ring-die E, the ring-follower M, piston L, piston-rod K, provided with the yoke K', sliding box I, and shaft G, provided with the crank H, all arranged and adapted to operate substantially as and for the purposes described.

Executed at Boston this 3d day of August, A. D. 1877.

BENJA. F. YOUNG.

Witnesses:
N. C. LOMBARD,
E. A. HEMMENWAY.